(12) United States Patent
Brumberg

(10) Patent No.: US 10,830,173 B2
(45) Date of Patent: Nov. 10, 2020

(54) ENGINE AND SYSTEMS FOR AN ENGINE

(71) Applicant: GE Global Sourcing LLC, Norwalk, CT (US)

(72) Inventor: Justin Thomas Brumberg, Slippery Rock, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/573,808

(22) Filed: Sep. 17, 2019

(65) Prior Publication Data

US 2020/0088130 A1 Mar. 19, 2020

Related U.S. Application Data

(60) Provisional application No. 62/732,948, filed on Sep. 18, 2018.

(51) Int. Cl.
| | |
|---|---|
| *F02F 3/28* | (2006.01) |
| *F02M 61/14* | (2006.01) |
| *F02B 23/10* | (2006.01) |
| *F02D 41/38* | (2006.01) |
| *F02F 3/24* | (2006.01) |
| *F02D 41/40* | (2006.01) |
| *F02F 1/24* | (2006.01) |

(52) U.S. Cl.
CPC .............. *F02F 3/28* (2013.01); *F02B 23/104* (2013.01); *F02D 41/38* (2013.01); *F02M 61/14* (2013.01); *F02D 41/401* (2013.01); *F02F 1/242* (2013.01); *F02F 3/24* (2013.01)

(58) Field of Classification Search
CPC ..... F02F 3/28; F02F 1/242; F02F 3/24; F02B 23/104; F02D 41/38; F02D 41/401; F02M 61/14

See application file for complete search history.

(56) References Cited

U.S. PATENT DOCUMENTS

| | | | | |
|---|---|---|---|---|
| 5,065,715 A | * | 11/1991 | Evans | F02B 23/08 |
| | | | | 123/263 |
| 8,459,229 B2 | * | 6/2013 | Rothbauer | F02B 23/0651 |
| | | | | 123/276 |
| 9,670,829 B2 | * | 6/2017 | Bowing | F02B 23/0639 |
| 2007/0044755 A1 | * | 3/2007 | Lehmann | F02F 3/10 |
| | | | | 123/307 |

* cited by examiner

*Primary Examiner* — Syed O Hasan
(74) *Attorney, Agent, or Firm* — McCoy Russell LLP

(57) ABSTRACT

Various systems are provided a piston for an engine. The piston has a piston crown, which includes a plurality of protrusions for enhancing mixing in a combustion chamber. As one example, a piston crown includes a plurality of protrusions extending outward from a top surface of the piston crown and spaced apart from one another around a circumference of the piston crown, each protrusion of the plurality of protrusions increasing in height and decreasing in width as the protrusion extends outward from a central axis of the piston crown.

17 Claims, 5 Drawing Sheets

ENGINE AND SYSTEMS FOR AN ENGINE

CROSS REFERENCE TO RELATED APPLICATIONS

The present application claims priority to U.S. Provisional Application No. 62/732,948, titled "LOCOMOTIVE ENGINE", and filed on Sep. 18, 2018. The entire contents of the above-identified application are hereby incorporated by reference for all purposes.

BACKGROUND

Technical Field

Embodiments of the subject matter disclosed herein relate to a piston crown of a piston of a combustion system for an engine.

Discussion of Art

A combustion system for an engine may include a combustion chamber formed by a cylinder and piston disposed in the cylinder. The top of the combustion chamber may include a fuel injector for injecting fuel into the combustion chamber, toward the top of the piston. The piston includes a piston crown having a top surface facing the fuel injector. In a compression ignition engine, the piston moves within the cylinder to compress air inside the combustion chamber. The fuel injector then sprays fuel into the combustion chamber and the injected fuel mixes with the hot, compressed air and ignites.

BRIEF DESCRIPTION

In one embodiment, a piston includes a piston crown. The piston crown includes a plurality of protrusions extending outward from a top surface of the piston crown and spaced apart from one another around a circumference of the piston crown. Each protrusion of the plurality of protrusions increases in height and decreases in width as the protrusion extends outward from a central axis of the piston crown.

BRIEF DESCRIPTION OF THE DRAWINGS

FIGS. 3-4 are shown approximately to scale.

DETAILED DESCRIPTION

The following description relates to embodiments of a piston crown of a piston adapted to be installed in a cylinder of a combustion system. As one example, a piston crown includes a plurality of protrusions extending outward from a top surface of the piston crown and spaced apart from one another around a circumference of the piston crown, each protrusion of the plurality of protrusions increasing in height and decreasing in width as the protrusion extends outward from a central axis of the piston crown. In this way, each protrusion may protrude into a combustion chamber of the combustion system, toward a top of the combustion chamber including a fuel injector. The fuel injector may be centrally positioned at the top of the combustion chamber, and thus, in line with a central axis of the piston crown. The fuel injector may include a plurality of nozzle holes around a circumference of a tip of the fuel injector, each of the nozzle holes adapted to spray fuel downward and outward toward the top of the piston crown. Each protrusion of the piston crown may be arranged such that the spray from each nozzle hole is received at the piston crown, between two adjacent protrusions. The protrusions are shaped to enhance air and fuel mixing within the combustion chamber, thereby increasing the efficiency of combustion and reducing unburned hydrocarbons and particular matter emissions resulting from the combustion process. In one example, the protrusions may be wedge-shaped and protrude from a base of the piston crown. For example, the protrusions may have a geometry that increases in height and decreases in width, from a first end, located proximate to the central axis, to a second end, located proximate to an outer circumferential perimeter of the piston. In some examples, the geometry may be swept-wing such that the protrusions may increase in height and decrease in width, from the first end to the second end, but with the first end offset relative to the second end.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a rail vehicle (e.g., locomotive) is provided as an example of a mobile platform supporting a system incorporating an embodiment of the invention.

Figure 1:
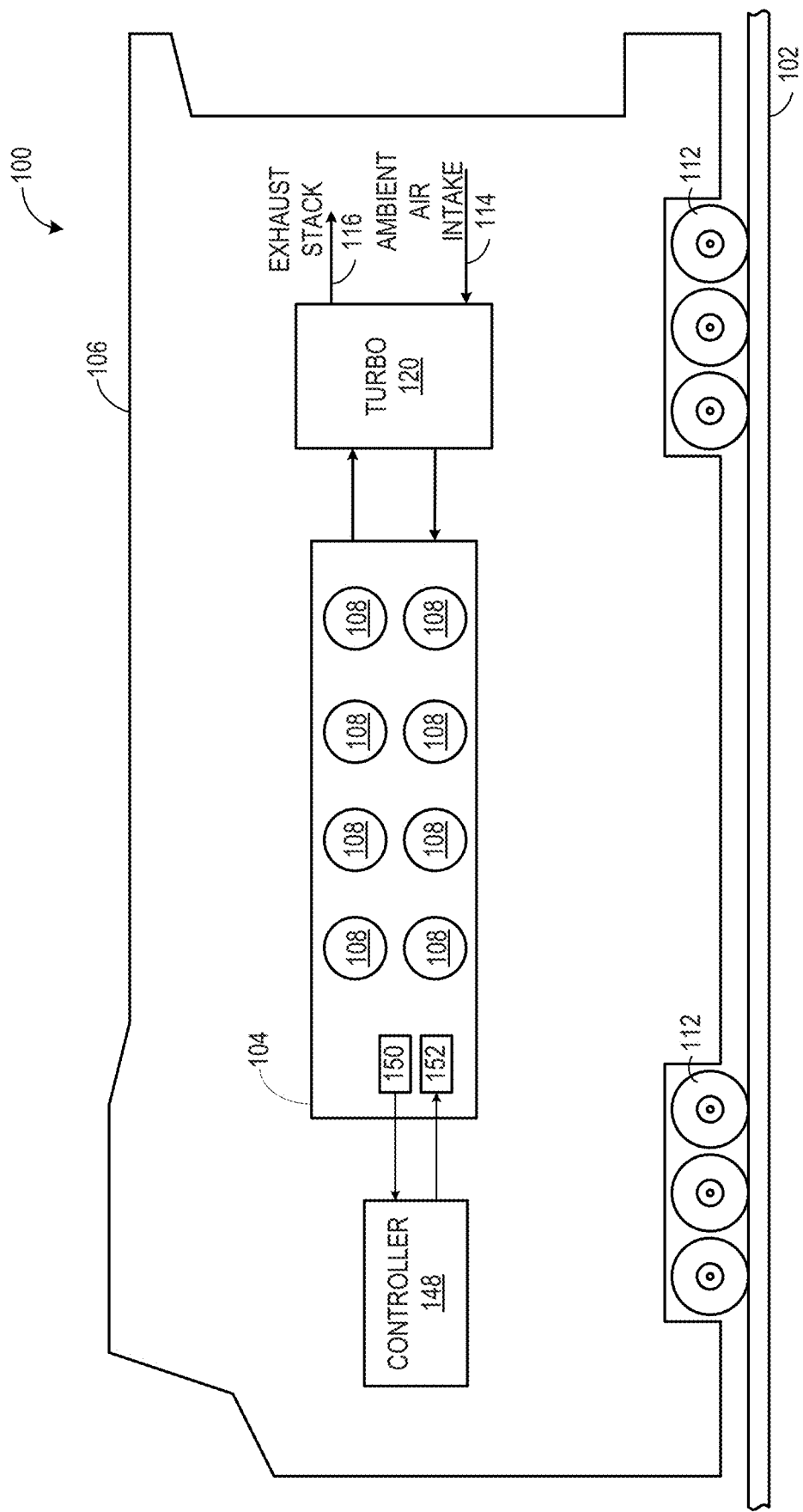
FIG. 1 shows a schematic diagram of a vehicle with an engine according to an embodiment of the disclosure.

An example of a platform is disclosed in which an engine including a combustion system may be installed in a vehicle, such as a rail vehicle. FIG. 1 shows a block diagram of an embodiment of a vehicle system 100, herein depicted as vehicle 106. The illustrated vehicle is a rail vehicle configured to run on a rail 102 via a plurality of wheels 112. As depicted, the vehicle includes an engine system with an engine 104. In one embodiment herein, the engine is a multi-fuel engine operating with diesel fuel and natural gas, but in other examples the engine may use various combinations of fuels other than diesel and natural gas. In yet another embodiment, the engine may be a single-fuel engine operating with only one fuel, such as diesel fuel, gasoline or natural gas.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system can include a turbocharger 120 ("TURBO") (or supercharger) that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In other embodiments, the engine system may not include a turbocharger.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller (e.g., electronic controller) 148 may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

As shown in FIG. 1, the engine includes a plurality of cylinders 108. Though FIG. 1 depicts an engine with 8 cylinders, other numbers of cylinders are possible (such as twelve cylinders arranged in two banks of six cylinders on each bank, or six cylinders arranged in a single bank).

Figure 2:
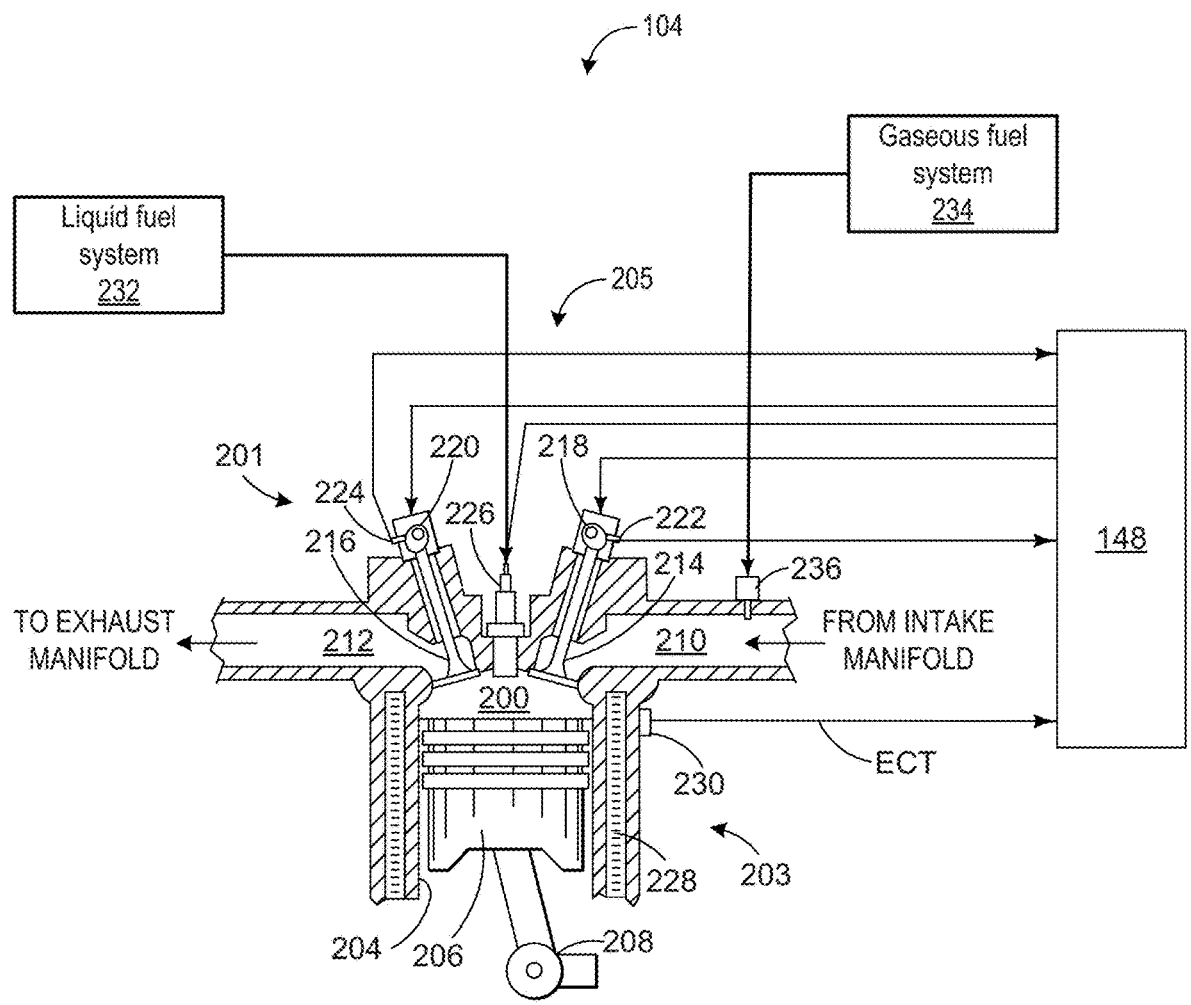
FIG. 2 shows a schematic diagram of an example cylinder of a multi-fuel engine according to an embodiment of the disclosure.

FIG. 2 depicts an embodiment of a combustion system 205 including a chamber, or cylinder 200, of a multi-cylinder internal combustion engine, such as the engine described above with reference to FIG. 1. For example, the cylinder may be any one of the cylinders 108 shown in FIG. 1. The cylinder may be defined by a cylinder head 201, housing the intake and exhaust valves and liquid fuel injector, described below, and a cylinder block 203.

The engine may be controlled at least partially by a control system including controller 148 which may be in further communication with a vehicle system, such as the locomotive described above with reference to FIG. 1. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, knock sensor data, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. A top-most portion (e.g., the portion facing the top of the combustion chamber including the intake and exhaust valves and fuel injector, as described below) of the piston may be referred to herein as a piston crown. The piston may be coupled to a crankshaft 208 so that reciprocating motion of the piston is translated through a connecting rod into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example, or the exhaust passage may communicate exclusively with the cylinder.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein via one or more nozzle holes. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, fueling to the cylinder may be controlled by the controller actuating the fuel injector based on turbocharger speed fluctuations.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, opening time (in engine crank position or in engine crank degree) and/or duration of opening of the gas admission valve may be adjusted to regulate an amount of gaseous fuel provided to the cylinder. Adjusting the opening timing (e.g., when the gas admission valve is opened and closed) may be referred to herein as adjusting induction timing of gaseous fuel. As one example, the duration of gas admission (or gas valve) opening is defined by the engine crank degrees corresponding to opening and closing of the gas admission valve. Each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve opening time (in engine crank position in engine crank degree) and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc. In yet another embodiment, gaseous fuel from the gaseous fuel system may be directly injected into the engine cylinders. For example, each cylinder may include a direct fuel injector or gas admission valve (similar to valve 236) coupled directly to an engine cylinder. In this way, both diesel and gaseous fuel may be directly injected into individual engine cylinders (e.g., such as in a high pressure "dual-fuel" direct injection system). Additionally, in one embodiment, each engine cylinder may include a spark plug for igniting fuel, such as natural gas, at the engine cylinder. In another embodiment, each engine cylinder may include an alternate ignition device (other than a spark plug) for igniting fuel at the engine cylinder, such as a laser or an alternate ignition source.

Figure 3:
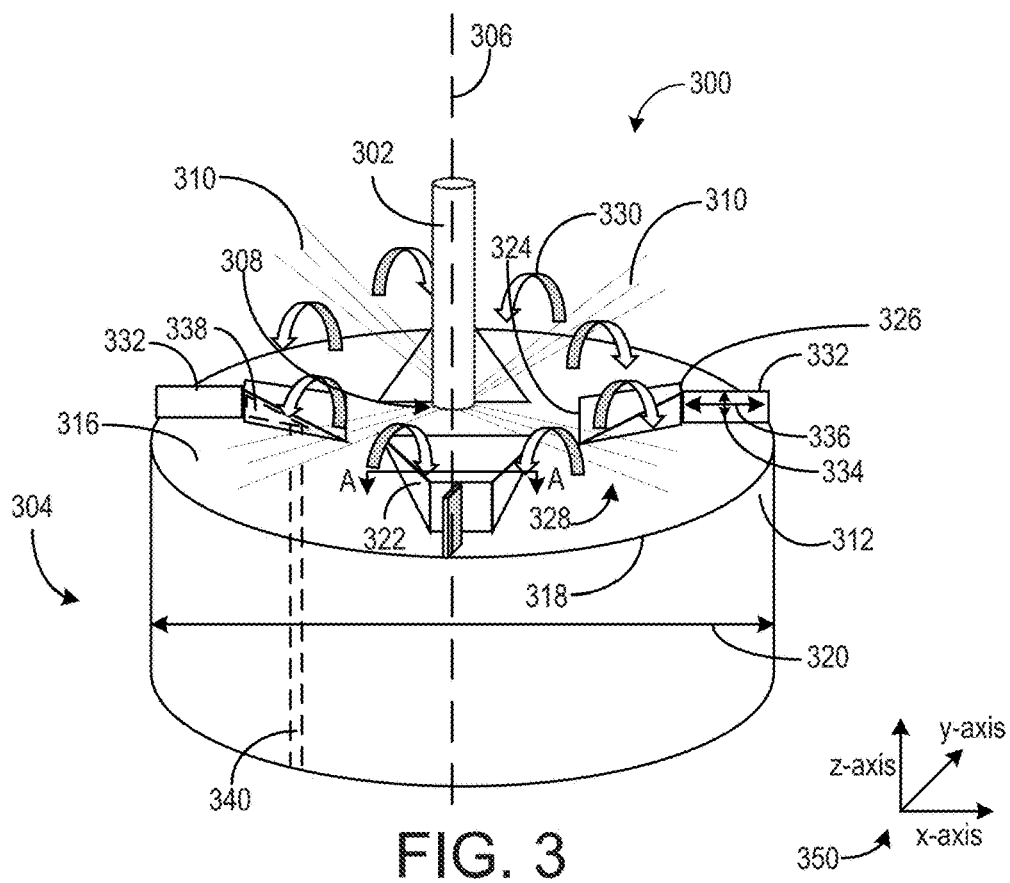
FIG. 3 shows a combustion system including a piston crown with protrusions, according to an embodiment of the disclosure.

Turning now to FIG. 3, a combustion system 300 is shown. The combustion system may be similar to combustion system 205 shown in FIG. 2 and may be included in an engine, such as the engine 104 shown in FIGS. 1 and 2. In one embodiment, the engine including the combustion system may be a compression ignition combustion system with the fuel injector arranged directly above the piston and adapted to inject fuel directly into the combustion chamber. FIG. 3 includes reference axes 350 including an x-axis, y-axis, and z-axis, where a central axis 306 of the combustion system and piston 304 of the combustion system is arranged in a direction of the z-axis.

As shown in FIG. 3, the combustion system 300 includes a fuel injector 302 and a piston 304. The fuel injector may be positioned at the top of a combustion chamber, such as the combustion chamber 200 shown in FIG. 2. The piston has a central axis 306 and the fuel injector is positioned in-line with the central axis such that the fuel injector is centered in the combustion chamber, above the piston. The fuel injector includes a plurality of nozzle holes 308 arranged around a circumference of a tip of the fuel injector. Fuel is injected from the fuel injector, through each nozzle hole, toward the piston and into the combustion chamber. An example fuel spray 310 from each nozzle hole is depicted in FIG. 3. In the example shown in FIG. 3, there are four fuel sprays, each of the four fuel sprays coming from one of the nozzle holes. Thus, the fuel injector shown in FIG. 3 has four nozzle holes. However, in alternate embodiments, the fuel injector may include more or less than four nozzle holes (such as two, three, five, six, or the like).

The piston includes a piston crown 312 at a top portion of the piston. The piston crown has a top surface 316 that faces upward toward the fuel injector and top of the combustion chamber in which the piston is installed. The top surface may also be referred to as a base of the piston crown. In some examples, the top surface 316 of the piston crown may include a piston bowl. The piston crown has an outer perimeter 318 which is defined by an outer diameter 320 of the piston crown (and piston). In FIG. 3, the top surface of the piston crown is shown to be planar. However, in alternate embodiments, the top surface (or base) of the piston crown may have a different geometry such as curvature, a wave-like surface, spaced apart depressions, protrusions, and the like. For example, in one embodiment, the top surface of the piston crown may include a depression between each set of adjacently arranged protrusions 322, as explained further below. In yet other embodiments, the piston crown may have a raised lip at the outer perimeter and the remaining portion of top surface of the piston crown may dip downward into the piston crown from the raised lip. In this way, the base or top surface of the piston crown may be the outer surface of the piston crown that faces the fuel injector and top of the combustion chamber and is depressed from the raised lip.

The piston crown includes a plurality of protrusions 322 extending outward from the top surface of the piston crown. Specifically, the protrusions 322 extend upward, away from the top surface and toward the fuel injector. In this way, the protrusions may be raised relative to the top surface or base of the piston crown. In one embodiment, the protrusions and piston crown are integrated together as a monolithic piece to define the top surface of the piston crown. For example, the protrusions and piston crown may be integral and formed as one piece, e.g., by casting in a mold, machining from a block of material, or using an additive manufacturing process, such as a "3D printer" to form the monolithic part.

The protrusions are spaced apart from one another around a circumference of the piston crown, around the central axis. In this way, none of the protrusions are touching any other protrusion of the protrusions 322. Each of the protrusions includes a first end 324 arranged proximate to the central axis and second end 326 arranged proximate to the outer perimeter. Said another way, the first end is arranged closer to the central axis than the outer perimeter, but spaced a distance away from the central axis, and the second end is arranged closer to the outer perimeter than the central axis, but spaced a distance away from the outer perimeter. In alternate embodiments, the first end may be positioned at the central axis and/or the second end may be positioned at the outer perimeter. In this way, each of the protrusions extends outward from the base of the piston crown, in a direction of the z-axis, and radially outward from the central axis and toward the outer perimeter.

Each space, or gap, 328 between adjacently arranged protrusions is adapted to receive the fuel spray from a nozzle hole of the fuel injector. As shown in FIG. 3, there are four protrusions and four fuel sprays (one from each nozzle hole), where each fuel spray is received between a different space between a different set of two protrusions of the protrusions. In this way, the number of protrusions equals the number of nozzle holes of the fuel injector. Thus, in alternate embodiments, if the fuel injector includes three, five, or six nozzle holes, then the piston crown would include three, five, or six, respectively, of the protrusions.

Each of the protrusions 322 has a wedge-shape or swept wing geometry with a shorter end and taller end. As shown in FIG. 3, a height of the first end of each protrusion is shorter than a height of the second end of each protrusion. In one example, the first end of each protrusion may be flush with the top surface of the piston crown and the second end of each protrusion is raised relative to the first end and the top surface. In this way, each protrusion increases in height, the height being in the direction of the central axis, radially outward from the central axis to the outer perimeter of the piston crown. In an alternate embodiment, the first end may be higher than the second end and the height of each protrusion may decrease from the central axis to the outer perimeter.

As also shown in FIG. 3, the width of each protrusion changes along the protrusion, from the first end to the second end. For example, as shown in FIG. 3, the first end is wider than the second end. In an alternate embodiment, the first end may be narrower than the second end. As shown in FIG. 3, the increasing height and decreasing width of each protrusion, from the first end proximate to the central axis to the second end proximate to the outer perimeter, may accommodate the fuel spray which widens as it extends further away from the fuel injector. This geometry may create vortices 330 and increase the air and fuel mixing within the combustion chamber.

Figure 4:
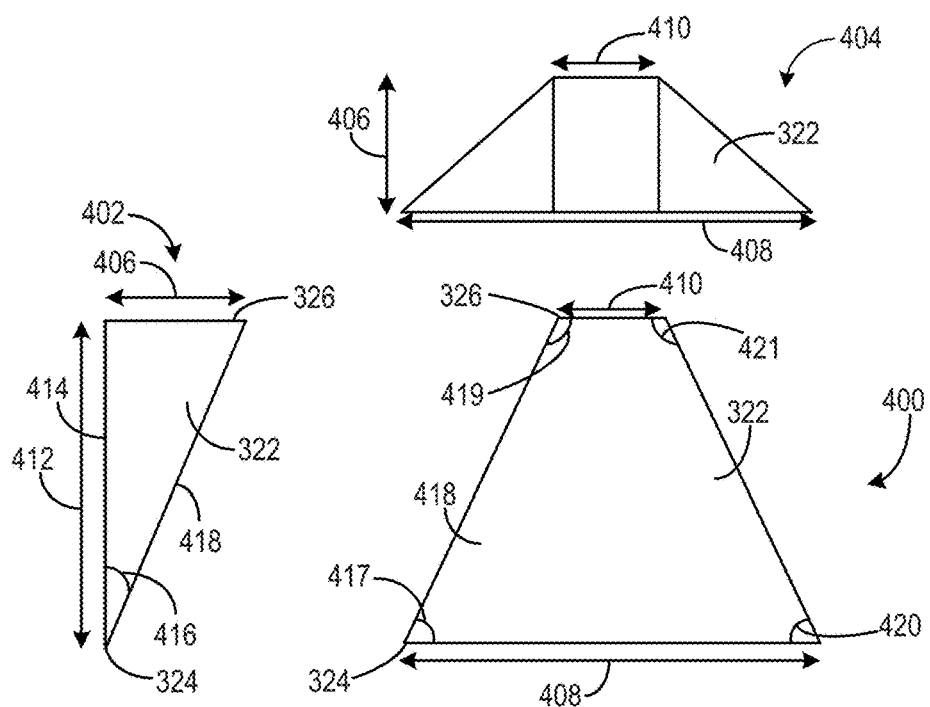
FIG. 4 shows cross-sections of the protrusions of FIG. 3, according to an embodiment of the disclosure.

Further details on the shape of the protrusions 322 are shown in FIG. 4. Specifically, FIG. 4 shows different views of one of the protrusions 322, including a top view 400, side view 402, and an end view 404, looking from section A-A in FIG. 3 to the center axis 306. The top view is looking down at the top of the protrusion and piston crown from the fuel injector and the side view is looking at the side of the protrusion, between the first end 324 and second end 326.

As shown in FIG. 4, a first height of the first end 324 of the protrusion is approximately zero such that it is flush with the top surface of the piston crown. However, in alternate embodiments, the first height of the first end may be greater than zero. Further, a second height 406 of the second end 326 is greater than the first height of the first end of the protrusion. In this way, the height of the entire protrusion increases from the first end to the second end, in a radial direction extending from the central axis to the outer perimeter of the piston crown. As shown in the side view of FIG. 4 and in FIG. 3, the protrusion has a profile that increases in height from the first end and a central axis of the piston to the second end and an outer circumference (e.g., perimeter) of the piston. As also discussed above, the width of the protrusion may decrease in width from the first end to the second end. For example, as shown in FIG. 4, a first width 408 of the first end is larger than a second width 410 of the second end. However, in alternate embodiments, the first width may be smaller than the second width.

The side view of FIG. 4 also shows a length 412 of the protrusion, from the first end to the second end, the length extending radially across the piston crown, as shown in FIG. 3. The side view of FIG. 4 also shows the bottom surface 414 of the protrusion which has face-sharing contact with the top surface of the piston crown in FIG. 3 (though this bottom surface may be integrated together with the top surface of the piston crown, as explained above). The protrusion has a ramped profile, from the wider, first end to the narrower, second end, which has an angle of inclination 416, defined between the bottom surface 414 (and top surface of the piston crown crown) and the top surface 418 of the protrusion. The angle of inclination may be in a range of 5-85 degrees. In another example, the angle of inclination may be in a range of 30-60 degrees (relative to the top surface of the piston crown). In another example, the angle of inclination may be in a range of 20-50 degrees. In yet another example, the angle of inclination may be in a range of 30-75 degrees. This angle increases as the length 414 decreases and/or the second height 406 increases. The length of the protrusion may be selected based on the outer diameter of the piston (e.g., as the piston outer diameter increases, the length of the protrusion may increase). Additionally, the second height (e.g., largest height) of the protrusion may be selected based on a clearance between a top-most surface of the piston crown and a top of the combustion chamber. Further, the first and second widths of the protrusion may be selected based on a width of the fuel spray, which may be based on a geometry of the fuel injector nozzle hole. For example, as the fuel spray widens, the second width of the protrusion may decrease. In addition the first and second widths may be selected based on the number of protrusions which may be based on the number of fuel injection holes.

Additionally, the geometry of the protrusion and the top surface may be further defined by a first angle 417 and second angle 419. As shown in FIG. 4, the first angle is acute (less than 90 degrees, but greater than 0 degrees) and the second angle is obtuse (greater than 90 degrees, but less than 180 degrees). In some embodiments, a third angle 420 may be equal to the first angle (the angles may both be 65°) and a fourth angle 421 may be equal to the second angle (e.g., the angles may both be 115°). In other embodiments, the angles may be different. For example, the second angle may be 100° and the fourth angle may be 130°. Such a geometry may be referred to as a swept-wing geometry and may result in the second end being offset from the first end. For example, a center of the second end may be shifted to the right or left of the center of the first end.

As shown in FIGS. 3 and 4, the top surface of each protrusion faces upward and outward relative to the top surface of the piston crown and is defined between the wider, first end and the narrower, second end. In one embodiment, as shown in FIGS. 3 and 4, the top surface of each protrusion is planar. In another embodiment, the top surface of each protrusion is convex. In yet another embodiment, the top surface of each protrusion is concave. In still another embodiment, the top surface of the protrusion may be planar but the outer edges, defining the profile (or sides) of the protrusion may be curved (rather than linear, as shown in FIGS. 3 and 4). In still other embodiments, additionally or alternatively, only the top surface or each outer surface of the protrusion may be textured. In other embodiments, the top surface of each protrusion may be smooth. In still other embodiments, the top surface of each protrusion may include additional small protrusions, wave-like features, or fins that increase the vortices and mixing in the combustion chamber. In yet another embodiment, one or more outer surfaces of each protrusion may be coated or have a treated surface. This coating or surface treatment may be applied to one or more of the outer surfaces of each protrusion and/or each surface may include a different coating and/or treatment. For example, the top surface of each protrusion may have a rough coating or treatment while the remaining surfaces (e.g., side surfaces) are smooth. In another example, all the outer surfaces of each protrusion may be coated or treated, but the coating or treatment on the top surface being rougher than the side surfaces.

Returning to FIG. 3, the piston crown additionally includes a plurality of dividers (also referred to herein as dividing extensions) 332. Each divider is coupled to the second end of one of the protrusions and extends outward from the second end to the outer perimeter of the piston crown (and piston). As shown in FIG. 3, the divider is directly coupled to a midpoint of the second end of the protrusion. In alternate embodiments, the divider may be offset from the midpoint of the second end of the protrusion. The divider, along its length 336, extends all the way to the outer perimeter of the piston crown. However, in alternate embodiments, the divider may extend only a portion of the way to the outer perimeter and be spaced away from the outer perimeter. In yet another embodiment, if the piston crown includes a raised lip at the outer perimeter, the divider may only extend to an outer edge of the piston crown, before it curves upward to the raised lip.

Each divider has a height 334 that is equal to a height (second height 406) of the second end of the protrusion to which it is coupled and a thickness that is smaller than a width (second width 410) of the second end of the protrusion to which it is coupled. In an alternate embodiment, the height of the divider may be shorter than the height of the second end of the protrusion to which it is coupled. In one embodiment, the divider may be integrated together and formed as one piece with the protrusion to which it is coupled. In another embodiment, the divider may be rigid and attached to the second end of the protrusion. In yet another embodiment, each divider may be a vane that is movable, in either or both directions along the outer perimeter, from an axis arranged at the second end of a respective protrusion, along a back surface of the respective protrusion, the back surface arranged perpendicular to the top surface of the base (e.g., top surface) of the piston crown. For example, each vane may be configured to rotate around an axis of a first end of the vane that is proximate the second end of the respective protrusion, causing a second end of the vane, opposite the first end to move along the outer perimeter. Each vane may include an actuator that is configured to move that respective vane, or each vane may be coupled to a common actuator that is configured to move all vanes in tandem. The vanes may include a suitable mechanism, such as a shaft coupled to the vane at the first end of the vane proximate the respective protrusion, that may be rotated or otherwise moved to adjust the position of the vane. The shaft may be rotated by an actuator such as a stepper motor. In other examples, the second end of the vane proximate the outer perimeter may be moved by a suitable actuator such as a pneumatic, hydraulic, or an electromagnetic actuator. In some embodiments, the vanes may be moved based on fuel parameters, such as an amount of fuel being injected, in-cylinder pressure, or other parameters that may affect air-fuel mixing. For example, the vanes may be moved to a first position (e.g., at 90° relative to the second ends of the protrusions, as shown in FIG. 3) during a first condition (e.g., low engine speed and/or load where fuel injection amounts may be lower) and moved to a second position (e.g., at 45° relative to the second ends) during a second condition (e.g., high engine speed and/or load where fuel injection amounts may be higher). In an alternate embodiment, the piston crown may not include the dividers and there may be no dividers coupled to the second end of the protrusions.

In some embodiments, such as the embodiment shown in FIG. 3, each protrusion may include a cooling channel 338 arranged within an interior of the protrusion. The cooling channel may be arranged proximate to a top, outer edge of the second end of the protrusion in order to provide increased cooling to this end of the protrusion. As shown in FIG. 3, the cooling channel 338 is a cavity defined by an inner surface of the protrusion. However, in alternate embodiments, the cavity may instead be one or more individual cooling channels or passages. Additionally, as shown in FIG. 3 the cooling channel or cavity of each protrusion is directly coupled to and in fluid communication with a piston cooling channel 340 in the piston crown. In this way, the piston cooling channel may be adapted to flow cooled coolant or cooling fluid (such as cooling oil or water) to the protrusion cooling channels or cavities. As a result, the protrusions, exposed to hot combustion gases, may be cooled.

Figure 5A:
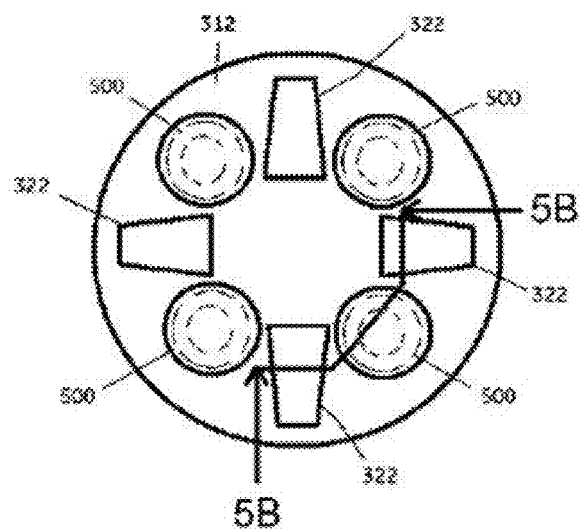
FIG. 5A shows an embodiment of a piston crown having depressions positioned between adjacent protrusions.
Figure 5B:
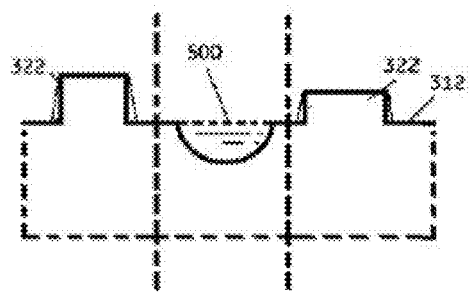
FIG. 5B is a partial cross-sectional view of FIG. 5A taken along sectional line 5B-5B.

As mentioned, in embodiments, the top surface of the piston crown includes respective depressions between each set of adjacently arranged protrusions 322. The depressions may further facilitate air and fuel mixing in the combustion chamber. The depressions may be circular or oval or otherwise ovoid, or radial, or angular (e.g., square or rectangular recesses), etc., and may be regular or irregular. The depressions may occupy the entire space between adjacent protrusions, or only part of the space. FIGS. 5A and 5B (not to scale; FIG. 5B is a cross-sectional view taken along sectional line 5B-5B in FIG. 5A) show an example of an embodiment of a piston crown 312 having depressions 500 formed therein. Here, each depression 500 is a circular depression (e.g., a dimple) formed in the surface of the piston crown, and positioned between a pair of adjacent protrusions 322 but occupying only part of the space therebetween.

Figure 6A:
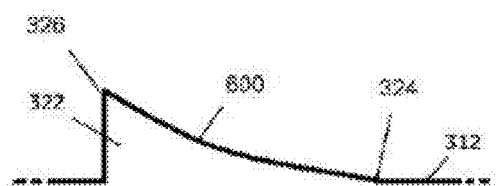
FIGS. 6A and 6B illustrate embodiments of different protrusion surface configurations.
Figure 6B:
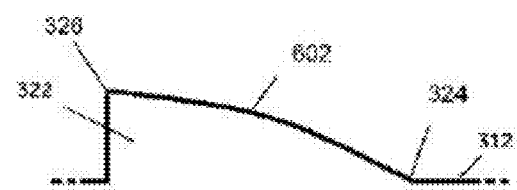

As shown in FIGS. 3-4, the top surfaces of the protrusions may be flat. In other embodiments, with reference to FIGS. 6A-6B as two examples, the top surfaces are other than flat surfaces. FIG. 6A shows an embodiment of a protrusion 322 having a concave surface 600. FIG. 6B shows an embodiment of a protrusion 322 having a convex surface 602. (Both FIG. 6A and FIG. 6B are schematic cross-sectional views taken along a radial direction of the piston crown, e.g., similar to the orientation of the protrusions as shown in FIG. 3.)

FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In any of the embodiments herein, the protrusions of a piston crown may all be the same as one another (e.g., have the same geometry/shape), or, in a given piston crown, some of the protrusions may be the same as other protrusions but different from at least one other protrusion of the piston crown.

Figure 7:
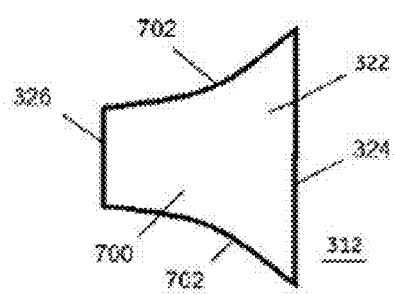
FIG. 7 is a top-down view of an embodiment of a protrusion having curved side surfaces.

In embodiments, the protrusions have a wedge and/or swept wing geometry, referring to a polyhedron (e.g., wedge shape) where the surfaces of the protrusion (e.g., top, sides, front) are all planar and polygonal. In other embodiments, one or more surfaces of a protrusion may be curved, see, e.g., FIGS. 6A-6B as examples of concave and convex top surfaces, respectively. See also FIG. 7, which shows a top-down view of a protrusion having a flat top surface 700 and curved side surfaces 702.

Figure 8:
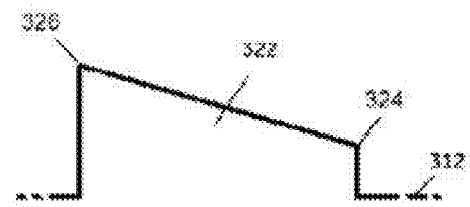
FIG. 8 is a radial cross-sectional view of an embodiment of a piston crown having a protrusion with a stepped first end.

As noted, in embodiments, the first, radially most-inwards end 324 of each protrusion may be flush with the top surface of the piston crown. In other embodiments, with reference to FIG. 8, the first end 324 has a non-zero height relative to the surrounding surface of the piston crown, such that the first end is stepped/elevated.

Figure 9:
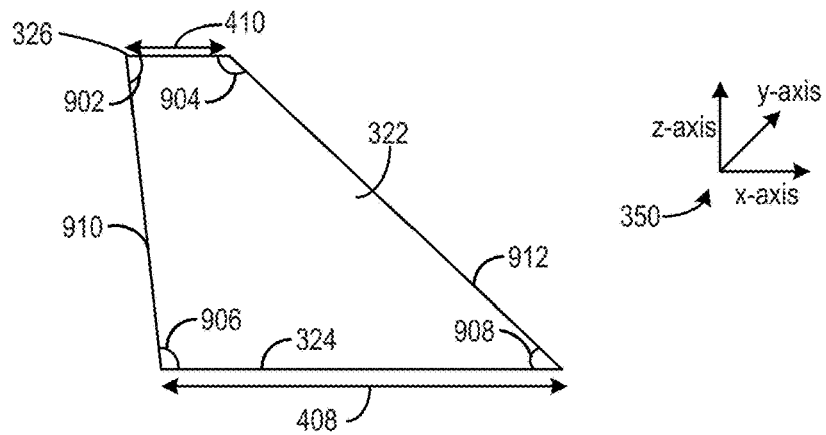
FIG. 9 shows a cross-section of a protrusion, according to an embodiment of the disclosure.

As mentioned, in some embodiments, the protrusions may have a swept swing geometry. FIG. 9 shows an example of a protrusion 322 having a swept wing geometry. Protrusion 322 includes first end 324 and second end 326, which may each be of the widths described above (e.g., first end 324 may have width 408 and second end 326 may have width 410). However, first end 324 may be offset from second end 326 such that a center point of first end 324 is not aligned with a center point of second end 326 along an axis that is parallel to the z-axis. Protrusion 322 includes a first side surface 910 and a second side surface 912 opposite the first side surface. Protrusion 322 shown in FIG. 9 includes four angles, a first angle 902 between second end 326 and first side surface 910, a second angle 904 between second end 326 and second side surface 912, a third angle 906 between first end 324 and first side surface 910, and a fourth angle 908 between second end 408 and second side surface 912. In the example shown, first angle 902 may be an acute angle (e.g., 83°), second angle 904 may be an obtuse angle (e.g., 135°), third angle 906 may be an obtuse angle (e.g., 97°), and fourth angle 908 may be an acute angle (e.g., 45°). In this way, the top surface of the protrusion may be "swept back" from the first end 324 to the second end 326. While not shown in FIG. 9, it is to be understood that the heights described above (e.g., second end 326 having a height 406 that decreases to first end 324) apply to the protrusion 322 shown in FIG. 9.

Figure 10:
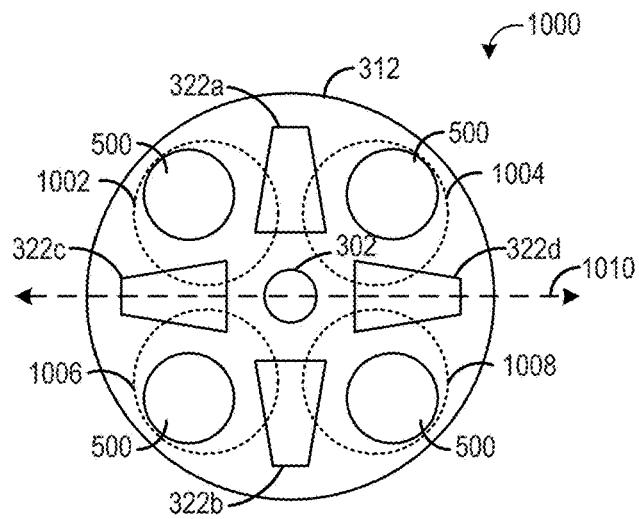
FIG. 10 shows a top-down view of an embodiment of a piston crown in a first orientation.
Figure 11:
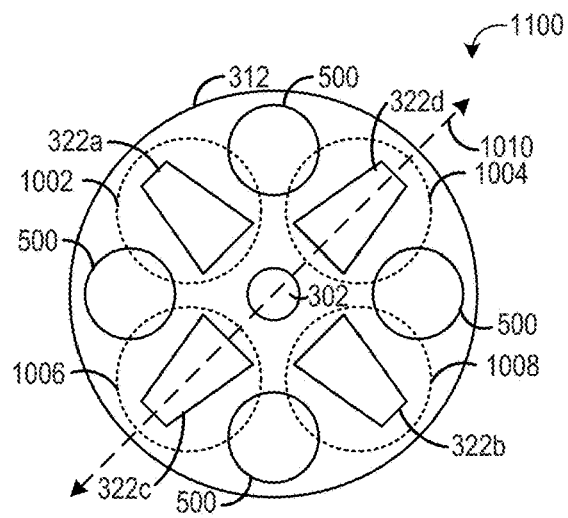
FIG. 11 shows a top-down view of an embodiment of a piston crown in a second orientation.

As discussed previously, piston 304 having piston crown 312 may be positioned in a cylinder, such as cylinder 200 of FIG. 2. When positioned in a cylinder, piston 304 may be positioned under intake and exhaust valves of the cylinder. For example, as shown in FIG. 2, piston 206 is positioned under (and moves up and down with respect to) intake poppet valve 214 and exhaust poppet valve 216. The piston may be oriented with the protrusions and/or depressions of the piston crown relative to the intake and exhaust valves in a suitable manner to achieve desired air-fuel mixing. FIGS. 10 and 11 show example piston orientations with respect to a set of intake valves and exhaust valves.

Referring first to FIG. 10, it shows piston crown 312 in a first orientation 1000 relative to a set of intake valves (first intake valve 1002 and second intake valve 1004) and a set of exhaust valves (first exhaust valve 1006 and second exhaust valve 1008). The intake and exhaust valves are shown as dashed lines superimposed on the top of the piston crown 312, in order to schematically show where the intake and exhaust valves (and corresponding ports in the cylinder head) would be located relative to piston crown 312.

In the first orientation 1000, each valve may be positioned over a respective depression 500 (if included) and each protrusion 322 may be positioned between (and partially overlapping) two valves. For example, first intake valve 1002 may fully overlap a depression and may partially overlap with two protrusions. For example, as shown, a first protrusion 322a may partially overlap first intake valve 1002 and second intake valve 1004. Each additional protrusion may similarly overlap two valves, whether two intake valves (e.g., first protrusion 322a), two exhaust valves (e.g., second protrusion 322b), or an intake valve and an exhaust valve (e.g., third protrusion 322c and fourth protrusion 322d). Further, a central axis 1010 of piston crown 312 may bisect two protrusions and the fuel injector 302, but not any of the valves.

Referring now to FIG. 11, it shows piston crown 312 in a second orientation 1100. In the second orientation 1100, piston crown 312 has been rotated 45° relative to the first orientation 1000 (e.g., central axis 1010 is rotated and bisects two valves, first exhaust valve 1006 and second intake valve 1004). As such, each protrusion is fully overlapped with a respective valve. For example, first protrusion 322a fully overlaps first intake valve 1002, second protrusion 322b fully overlaps second exhaust valve 1008, third protrusion 322c fully overlaps first exhaust valve 1006, and fourth protrusion 322d fully overlaps second intake valve 1004. Each depression (if included) only partially overlaps two valves, though the majority of each depression does not overlap any valve. In some embodiments, when the piston crown 312 is in the second orientation 1100, the fuel injector 312 may be rotated such that each nozzle hole of the injector faces a respective opening between adjacent protrusions, as described above with respect to FIG. 3.

Thus, in the first orientation shown in FIG. 10, each valve of the set of intake valves and set of exhaust valves is positioned directly above a respective space (which may include a depression) of the piston crown and partially overlaps with the adjacently arranged protrusions defining the respective space. In the second orientation, each valve of the set of intake valves and set of exhaust valves is positioned directly above a respective protrusion of the piston crown and partially overlaps with two spaces each on either side of the respective protrusion.

The different orientations may provide for different levels/areas of air-fuel mixing due to the position of the intake valves and exhaust valves relative to the protrusions (and depressions, when included). As non-limiting examples, in the first orientation 1000 of FIG. 10, the fuel and air may preferentially mix in the depressions/areas between the protrusions and/or the fuel and air may preferentially mix at the center of the cylinder near the fuel injector. In contrast, in the second orientation 1100, the fuel and air may preferentially mix over the protrusions and/or the fuel and air may preferentially mix around the outer perimeter of the cylinder/piston crown. In some examples, the orientation of the piston crown relative to the intake and exhaust valves may be selected based on the compression ratio of the cylinder (e.g., a cylinder with a first, lower compression ratio may include a piston having a piston crown in the first orientation while a cylinder having a second, higher compression ratio may include a piston having a piston crown in the second orientation), overall horsepower of the engine, expected peak in-cylinder pressure, fuel configuration (e.g., liquid only versus gaseous and liquid fuel), and/or other engine configuration parameters. Further, in some examples, the piston may be coupled to an underlying piston rod in a rotatable manner such that the piston may be rotated to move the piston crown from the first orientation to the second orientation, and the selection of the orientation of the piston crown may be based on engine operating conditions (e.g., the first orientation at low engine speeds and/or loads, the second orientation at high engine speeds and/or loads).

In an embodiment, a piston includes a piston body terminating at a piston crown (e.g., the crown would define part of a combustion chamber and face a fuel injector when the piston is installed in an engine block cylinder). The piston crown includes a plurality of protrusions extending outward from a top surface of the piston crown and spaced apart from one another around a circumference of the piston crown. Each protrusion of the plurality of protrusions increases in height and decreases in width as the protrusion extends outward from a central axis of the piston crown.

In another embodiment of the piston, each protrusion has a first end arranged proximate to, but spaced away from, the central axis and a second end arranged proximate to, but spaced away from, an outer perimeter of the piston crown.

In another embodiment of the piston, each protrusion has a swept wing geometry to increase in height and decrease in width, from the first end to the second end.

In another embodiment of the piston, for each protrusion, the first end is arranged flush with the top surface of the piston crown and the second end is raised upward and away from the top surface, and the first end is wider than the second end.

In another embodiment of the piston, the piston further includes a plurality of dividers coupled to the plurality of protrusions. Each protrusion has at least one divider of the plurality of dividers coupled to a midpoint of the second end and extending outward from the second end and to the outer perimeter of the piston crown.

In another embodiment of the piston, each divider has a height that is equal to a height of the second end of the protrusion to which it is coupled and a thickness that is smaller than a width of the second end of the protrusion to which it is coupled.

In another embodiment of the piston, each protrusion includes at least one cooling channel arranged within an interior of the protrusion, proximate to a top, outer edge of the second end.

In another embodiment of the piston, the protrusions are integrated together with the piston crown as a monolithic piece to define the top surface of the piston crown.

In another embodiment of the piston, the piston further includes one or more cooling channels positioned within (e.g., formed in) the plurality of protrusions. In another embodiment, alternatively or additionally, one or more of the protrusions each include an inner surface that defines a cavity arranged within an interior of the protrusion and in fluid communication with cooling channel(s) in the piston crown.

In this way, a piston crown is provided with a plurality of protrusions extending outward and upward from a top surface of a piston crown and spaced apart from one another around a circumference of the piston crown. Each protrusion may have a wedge-shaped geometry that increases in height and decreases in width from a first end arranged proximate to a central axis of the piston crown to a second end arranged proximate to an outer perimeter of the piston crown. The protrusions may be positioned on the piston crown such that a fuel spray from a different nozzle hole of a fuel injector is received between each set of adjacently arranged protrusions. The technical effect of having a piston crown with a plurality of protrusions extending outward from a top surface of the piston crown and spaced apart from one another around a circumference of the piston crown, each protrusion of the plurality of protrusions increasing in height and decreasing in width as the protrusion extends outward from a central axis of the piston crown is increasing air and fuel mixing within the combustion chamber, thereby increasing the efficiency of combustion and reducing particulate matter emissions from an engine in which the piston crown is installed.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A piston, comprising: a piston crown, the piston crown comprising a plurality of protrusions extending outward from a top surface of the piston crown and spaced apart from one another around a circumference of the piston crown, each protrusion of the plurality of protrusions increasing in height and decreasing in width as the protrusion extends outward from a central axis of the piston crown, wherein each protrusion has a first end arranged proximate to, but spaced away from, the central axis and a second end arranged proximate to, but spaced away from, an outer perimeter of the piston crown, and wherein each protrusion has a swept wing geometry to increase in height and decrease in width, from the first end to the second end.

2. The piston of claim 1, wherein, for each protrusion, the first end is arranged flush with the top surface of the piston crown and the second end is raised upward and away from the top surface and wherein the first end is wider than the second end.

3. The piston of claim 1, further comprising a plurality of dividers coupled to the plurality of protrusions, where each protrusion has at least one divider of the plurality of dividers coupled to a midpoint of the second end and extending outward from the second end and to the outer perimeter of the piston crown.

4. The piston of claim 3, wherein each divider has a height that is equal to a height of the second end of the protrusion to which it is coupled and a thickness that is smaller than a width of the second end of the protrusion to which it is coupled.

5. The piston of claim 1, wherein each protrusion includes at least one cooling channel arranged within an interior of the protrusion, proximate to a top, outer edge of the second end.

6. The piston of claim 1, wherein the plurality of protrusions are integrated together with the piston crown as a monolithic piece to define the top surface of the piston crown.

7. The piston of claim 1, further comprising one or more cooling channels positioned within the plurality of protrusions.

8. The piston of claim 1, wherein each protrusion has an inner surface that defines a cavity arranged within an interior of the protrusion and in fluid communication with cooling channels in the piston crown.

9. A system, comprising:
an engine comprising a piston having a piston crown, the piston crown comprising:
a plurality of protrusions extending outward from a top surface of the piston crown and spaced apart from one another around a circumference of the piston crown, where each protrusion has a wider end arranged closer to a central axis than an outer perimeter of the piston crown and a narrower end positioned closer to the outer perimeter than the central axis, the narrower end raised relative to the top surface and the wider end; and
a plurality of dividing extensions, each dividing extension directly coupled to the narrower end of a respective protrusion and extending outward from the protrusion toward the outer perimeter.

10. The system of claim 9, wherein each protrusion has a ramped profile, from the wider end to the narrower end, having an angle of inclination in a range of 5-85 degrees, relative to the top surface of the piston crown.

11. The system of claim 10, wherein each protrusion has a top surface that faces upward and outward relative to the top surface of the piston crown and is defined between the wider end and the narrower end, where the top surface of each protrusion is planar.

12. The system of claim 10, wherein each protrusion has a top surface that faces upward and outward relative to the top surface of the piston crown and is defined between the wider end and the narrower end, where the top surface of each protrusion is convex or concave.

13. The system of claim 9, wherein each dividing extension is a vane movable, in either or both directions along the outer perimeter, from an axis arranged at the narrower end of a respective protrusion, along a back surface of the respective protrusion, the back surface arranged perpendicular to the top surface of the piston crown.

14. The system of claim 9, wherein the top surface of the piston crown includes a depression between each set of adjacently arranged protrusions.

15. A combustion system, comprising: a fuel injector arranged at a top of a combustion chamber, the fuel injector including a plurality of nozzle holes; and a piston positioned within the combustion chamber, the piston including a piston crown, the piston crown including a plurality of protrusions extending outward from a base of the piston crown, towards the fuel injector, with a profile that increases in height from a central axis of the piston to an outer circumference of the piston, the plurality of protrusions spaced apart from one another around the outer circumference with adjacently arranged protrusions of the plurality of protrusion arranged on the piston crown to receive a fuel spray from one nozzle of the plurality of nozzle holes in a space that separates the adjacently arranged protrusions, wherein a number of the plurality of protrusions equals a number of the plurality of nozzle holes, wherein the space that separates the adjacently arranged protrusions increases as a width of the fuel spray from each nozzle hole of the plurality of nozzle holes increases, where a largest width of each protrusion, in a direction tangent to the outer circumference of the piston, decreases with increasing space between adjacently arranged protrusions and an end of each protrusion of the plurality of protrusions that is arranged closest to central axis is narrower than an end of each protrusion that is arranged closest to the outer circumference of the piston.

16. The combustion system of claim 15, further comprising a set of intake valves positioned in the combustion chamber and a set of exhaust valves positioned with the combustion chamber, and wherein each valve of the set of intake valves and set of exhaust valves is positioned directly above a respective space of the piston crown and partially overlaps with the adjacently arranged protrusions defining the respective space.

17. The combustion system of claim 15, further comprising a set of intake valves positioned in the combustion chamber and a set of exhaust valves positioned with the combustion chamber, and wherein each valve of the set of intake valves and set of exhaust valves is positioned directly above a respective protrusion of the piston crown and partially overlaps with two spaces each on either side of the respective protrusion.

\* \* \* \* \*